US008463123B2

(12) United States Patent
Wang

(10) Patent No.: US 8,463,123 B2
(45) Date of Patent: Jun. 11, 2013

(54) OPTICAL SWITCH AND PROTOCOLS FOR USE THEREWITH

(75) Inventor: Guo-Qiang Wang, Nepean (CA)

(73) Assignee: Rockstar Consortium US LP, Richardson, TX (US)

( * ) Notice: Subject to any disclaimer, the term of this patent is extended or adjusted under 35 U.S.C. 154(b) by 3257 days.

(21) Appl. No.: 10/360,680

(22) Filed: Feb. 10, 2003

(65) Prior Publication Data

US 2003/0161632 A1  Aug. 28, 2003

Related U.S. Application Data

(63) Continuation of application No. 09/362,886, filed on Jul. 29, 1999, now Pat. No. 6,529,301.

(51) Int. Cl.
*H04J 14/00* (2006.01)

(52) U.S. Cl.
USPC ........................................................... 398/57

(58) Field of Classification Search
USPC .................. 398/45, 50, 55, 56, 82, 79, 48–49
See application file for complete search history.

(56) References Cited

U.S. PATENT DOCUMENTS

| 5,781,537 | A  |   | 7/1998 | Ramaswami et al. |        |
|-----------|----|---|--------|------------------|--------|
| 6,111,673 | A  | * | 8/2000 | Chang et al.     | 398/79 |
| 6,271,946 | B1 | * | 8/2001 | Chang et al.     | 398/79 |

FOREIGN PATENT DOCUMENTS

| EP | 0620694 A2  | 10/1994 |
| EP | 0 752 795 A2 | 1/1997  |
| EP | 0752795 A2  | 1/1997  |
| JP | 09-036892   | 2/1997  |

OTHER PUBLICATIONS

M. W. Maeda, "Management and control of transparent optical networks", IEEE Journal of Selected Areas in Communications vol. 6, Sep. 1998, pp. 1008-1023.*

Ezhan Karasan et al., "Effects of Wavelength Routing and Selection Algorithms on Wavelength Conversion Gain in WDM Optical Networks", IEEE/ACM Transactions on Networking, vol. 6, No. 2, Apr. 1998, pp. 186-196.

Oman (Ori) Gerstel et al., "Fault Tolerant Multiwavelength Optical Rings with Limited Wavelength Conversion", IEEE Journal on Selected Areas in Communications, vol. 16, No. 7, Sep. 1998. pp. 1166-1178.

Frowin Der et al: "An Optical Infrastructure for Future Telecommunications Networks" IEEE Communications Magazine, IEEE Service Center. Piscataway, N.J, US, vol. 33, No. 11, Nov. 1, 1995, pp. 84-88, XP000545290 ISSN: 0163-6804.

(Continued)

*Primary Examiner* — Shi K Li

(57) ABSTRACT

A method of establishing a data connection between terminal switching nodes in a network and switching nodes for implementing the method. The method involves switching nodes participating in a network layer wavelength routing (WR) protocol to determine the next hop switching node for every possible combination of terminal nodes based on the network topology. The method also involves the switching nodes participating in a network layer wavelength distribution (WD) once the data connection is to be established. The WR protocol determines the path used through the network, while the WD protocol assigns wavelengths on each link between switching nodes. The wavelengths may be different on different optical links. The switching nodes include wavelength converters with an optical switch or optoelectronic converters with a digital electronic switch. A digital electronic switch can also provide signal reformatting. Advantages of using potentially different wavelengths along various segments of a single end-to-end connection yields increased wavelength efficiency.

14 Claims, 7 Drawing Sheets

OTHER PUBLICATIONS

Okamoto S et al: "Optical Path Cross-Connect Node Architectures for Photonic Transport Network" Journal of Lightwave Technology, IEEE. New York, US, vol. 14, No. 6, Jun. 1, 1996, pp. 1410-1422, XP000598543 ISSN: 0733-8724.

Partial European Search Report EP 00 30 6485, Aug. 5, 2003.

Frowin, Der et al: "An Optical Infrastructure for Future Telecommunications Networks", IEEE Communications Magazine, IEEE Service Center, Piscataway, N.J., US, vol. 33, No. 11, Nov. 1, 1995, pp. 84-88, XP000545290, ISSN: 0163-6804.

Okamoto, S. et al: "Optical Path Cross-Connect Node Architectures for Photonic Transport Network", Journal of Lightwave Technology, IEEE, New York, US, vol. 14, No. 6, Jun. 1, 1996, pp. 1410-1422, XP000598543, ISSN: 0733-8724.

Brackett, C.A. et al.: "A Scalable Multiwavelength Multihop Optical Network: A Proposal for Research on All-Optical Networks", Journal of Lightwave Technology, IEEE, New York, US, vol. 11, No. 5/6, May 1, 1993, pp. 736-752, XP000396705, ISSN: 0733-8724.

Yuan, X et al: "Distributed Control in Optical WDM Networks", Military Communications Conference, 1996, Milcom '96, Conference Proceedings, IEEE, McLean, VA, USA, Oct. 21-24, 1996, New York, NY, USA, IEEE, US, Oct. 21, 1996, pp. 100-104, XP010203960, ISBN: 0-7803-3682-8.

Chuauning, Qiao et al: "Wavelength Reservation Under Distributed Control", Digest, IEEE/Leos 1996 Summer Topical Meetings, Advanced Applications of Lasers in Materials Processing; Broadband Optical Networks—Enabling Technologies and Applications; Smart Pixels; Optical MEMS and Their Applications (Cat. No. 96TH8164), Digest, pp. 45-46. XP002262477, 1996, New York, NY, USA, IEEE, USA, ISBN: 0-7803-3175-3.

\* cited by examiner

| PORT 710 | WAVELENGTH 720 | AVAILABILITY 730 |
|---|---|---|
| 402 | | |
| 404 | | |
| 406 | | |
| 408 | | |

| SSN 610 | DSN 620 | TCI 630 | NHSN 640 |
|---|---|---|---|
| | | | |

| SSN 610 | DSN 620 | TCI 630 | NHSN 640 |
|---|---|---|---|
| ... | ... | ... | ... |
| 802 | 824 | OC-4 OC-32 OC-192 GBE | 808 |
| ... | ... | ... | ... |

| SSN 610 | DSN 620 | TCI 630 | NHSN 640 |
|---|---|---|---|
| ... | ... | ... | ... |
| 802 | 824 | OC-4 OC-32 OC-192 GBE | 810 |
| ... | ... | ... | ... |

OPTICAL SWITCH AND PROTOCOLS FOR USE THEREWITH

FIELD OF THE INVENTION

The present invention relates to the field of optical switching in general and, more particularly, to optical switching nodes for use in an optical network. The invention also pertains to protocols governing the behaviour of the switching nodes.

BACKGROUND OF THE INVENTION

The development of high-capacity networks has been driven by the need to establish high-bandwidth data connections among remote sites, for instance, between clients and servers. Most often, the communications infrastructure for such a network is provided by one or more long-distance carriers serving the geographic region that encompasses the various remote sites. A carrier may lease fiber optic lines to customers wishing to establish high-capacity connections. Within the carrier's network, optical switching nodes are then configured to support the desired connections.

Usually, a carrier leases its fiber optic lines with a view to long-term usage thereof. Thus, switch configurations established at the time of provisioning the high-capacity connections are expected to remain in place for a period of months or years. Therefore, the switches in the network can be configured manually with virtually no impact on cost or quality of service provided.

However, it is not feasible to manually configure a large number of switches when dealing with a network whose size and/or topology are in constant evolution. Furthermore, the manual configuration of switches cannot accommodate situations in which the bandwidth or quality of service requirements of the traffic to be transported through the network is time-varying or if there is urgency in establishing new high-capacity connections through the network. Although it is desirable to provide switches which are automatically reconfigurable as a function of changes to the topology and traffic load of the network, such a capability is currently not available.

Moreover, the most common approach to establishing end-to-end data connections in current optical networks relies on the utilization of the same wavelength, say $\lambda_X$, along a manually configured path throughout the network. This prevents the establishment of other data connections using $\lambda_X$ as an end-to-end wavelength if part of the path corresponding to the new connection intersects part of the path corresponding to the original connection. This places a severe constraint on wavelength usage in a current optical network, with the effect of drastically reducing the overall bandwidth efficiency in the network.

Thus, it is apparent that there is a need in the industry to provide an optical switching node which overcomes the above stated disadvantages.

SUMMARY OF THE INVENTION

The invention can be described broadly as a switching node that includes an optical switch fabric, a wavelength conversion unit and a control unit. The optical switch fabric is connected to the control unit and is used for switching optical signals arriving on a set of input optical fiber segments over to a set of output optical fiber segments in accordance with mapping instructions received from the control unit. The wavelength conversion unit is connected to the optical switch fabric and is used for modifying the wavelengths occupied by incoming or switched optical signals in accordance with conversion commands received from the control unit.

The control unit is used for exchanging control information with other switching nodes using a network layer protocol and generating the mapping instructions and the conversion commands based on this control information. This switching node allows the input and output wavelengths of an optical data signal to occupy different wavelengths, which provides many benefits, among which is included the benefit of increased wavelength efficiency in an optical network.

Preferably, the control information is exchanged using a out-of-band control channel such as an optical supervisory channel.

Preferably, the control unit includes a processor and a memory element accessible by the processor. The memory element preferably stores a routing table and a wavelength availability table. The routing table contains a next hop switching node field associated with every possible pair of terminal switching nodes. The wavelength availability table contains the identity of the switching nodes connected to any of the ports by a respective multi-wavelength fiber optic link and, for each wavelength, an indication of whether that wavelength is occupied or available.

The switching node is most often connected to a previous switching node in a path identified by a first terminal switching node and a second terminal switching node. In such a scenario, the control unit is preferably operable to receive messages from the previous switching node.

If the message is a so-called CONNECTION_REQUEST message, then the control unit will preferably access the wavelength availability table to identify an available wavelength on the link between the current and previous switching nodes, the available wavelength being associated with one of the input optical fiber segments.

If the current switching node is the second terminal switching node, then the control unit will preferably generate mapping commands for establishing a connection, using the available wavelength, between the input optical fiber segment associated with the available wavelength and one of the output optical fiber segments; and send a CONNECTION_CONFIRM message to the previous switching node.

Otherwise, if the current switching node is not the second terminal switching node, the control unit will preferably access the routing table to determine the contents of the next hop switching node field associated with the first and second terminal switching nodes; and forward the CONNECTION_REQUEST message to the switching node identified by the next hop switching node field.

If, on the other hand, the message is a so-called CONNECTION_CONFIRM message, then the control unit will preferably generate mapping commands for establishing a connection using the available wavelength between the input optical fiber segment associated with the available wavelength and one of the output optical fiber segments; and send a CONNECTION_CONFIRM message to the previous switching node.

In order to accommodate a packet-based architecture, in which incoming optical signals are formed of packets having a header and a payload, the switching node may include an additional conversion unit connected to the input optical fiber segments and to the control unit, for extracting the header of each packet. In this case, the mapping instructions and the conversion commands generated by the controller will further be dependent on the information contained in the header of each packet.

In another embodiment, the switching node includes a first set of optoelectronic converters and a second set of optoelectronic converters. The first set of converters is used for converting input optical signals occupying respective wavelengths into electronic signals, while the second set of converters is used for converting output electronic signals into output optical signals occupying respective wavelengths.

The switching node also includes a digital switch fabric connected to the optoelectronic converters, for switching the input electronic signals over to the output electronic signals in accordance with switching instructions. Finally, the switching node includes a control unit connected to the digital switch fabric and to the optoelectronic converters. The control unit exchanges control information with other switching nodes using a network layer protocol and generates the switching instructions based on the control information.

In this embodiment, the switching node provides grooming functionality in the sense that the input electronic signals can be reformatted so that when these reformatted signals are switched and then converted into an optical format by the second set of converters, the resulting optical signal can be in a desired format. This improves compatibility among end user equipment in a network.

The invention may be summarized at the network level as a method of establishing a data connection between first and second terminal switching nodes. The network is understood to include the terminal switching nodes as well as a group of other switching nodes interconnected by multi-wavelength optical links.

The method includes a first step of identifying a path comprising a set of links and wavelengths for transporting data between the first and second terminal switching nodes via zero or more intermediate switching nodes.

The method also includes the step of, at each intermediate switching node connected to a respective ingress link and a respective egress link in the identified path, switching the optical signals arriving on the respective ingress link over to the respective egress link and performing wavelength conversion if the wavelengths occupied on the respective ingress and egress links are different. Advantageously, this allows a data connection to be established using different wavelengths along the way.

The invention can also be summarized as a wavelength distribution protocol for enabling a data connection to be established between a first terminal switching node and a second terminal switching node via zero or more intermediate switching nodes along a path in a network. The protocol is executed at the various switching nodes in the network.

At each current switching node connected in the path between a previous switching node and/or a next switching node by respective optical links, the protocol includes the capability to receive messages from the previous or next switching node.

If the message is a CONNECTION_REQUEST message, then if the current switching node is not the first terminal switching node, the protocol includes identifying and storing an available wavelength on the link between the current and previous switching nodes.

Also, if the message is a CONNECTION_REQUEST message and if the current switching node is indeed the second terminal switching node, the protocol includes establishing a connection using the available wavelength and sending a CONNECTION_CONFIRM message to the previous switching node, otherwise forwarding the CONNECTION_REQUEST message to the next switching node.

If, however, the message is a CONNECTION_CONFIRM message, then the protocol includes establishing a connection using the previously stored available wavelength and if the current switching node is not the first terminal switching node, sending a CONNECTION_CONFIRM message to the previous switching node.

For the protocol to operate as intended, an initial CONNECTION_REQUEST message is assumed to be sent to the first terminal switching node upon initially requesting the data connection.

By participating in this protocol, switching nodes automatically participate in the end-to-end establishment of data connections using dynamically assigned wavelengths, which improves overall bandwidth efficiency of the optical network and provides more flexible protection switching, which no longer requires the input and output wavelengths to be identical.

BRIEF DESCRIPTION OF THE DRAWINGS

These and other aspects and features of the present invention will become apparent to persons skilled in the art upon review of the following description of specific embodiments of the invention in conjunction with the accompanying drawings, in which.

DETAILED DESCRIPTION OF THE PREFERRED EMBODIMENT

Figure 1:
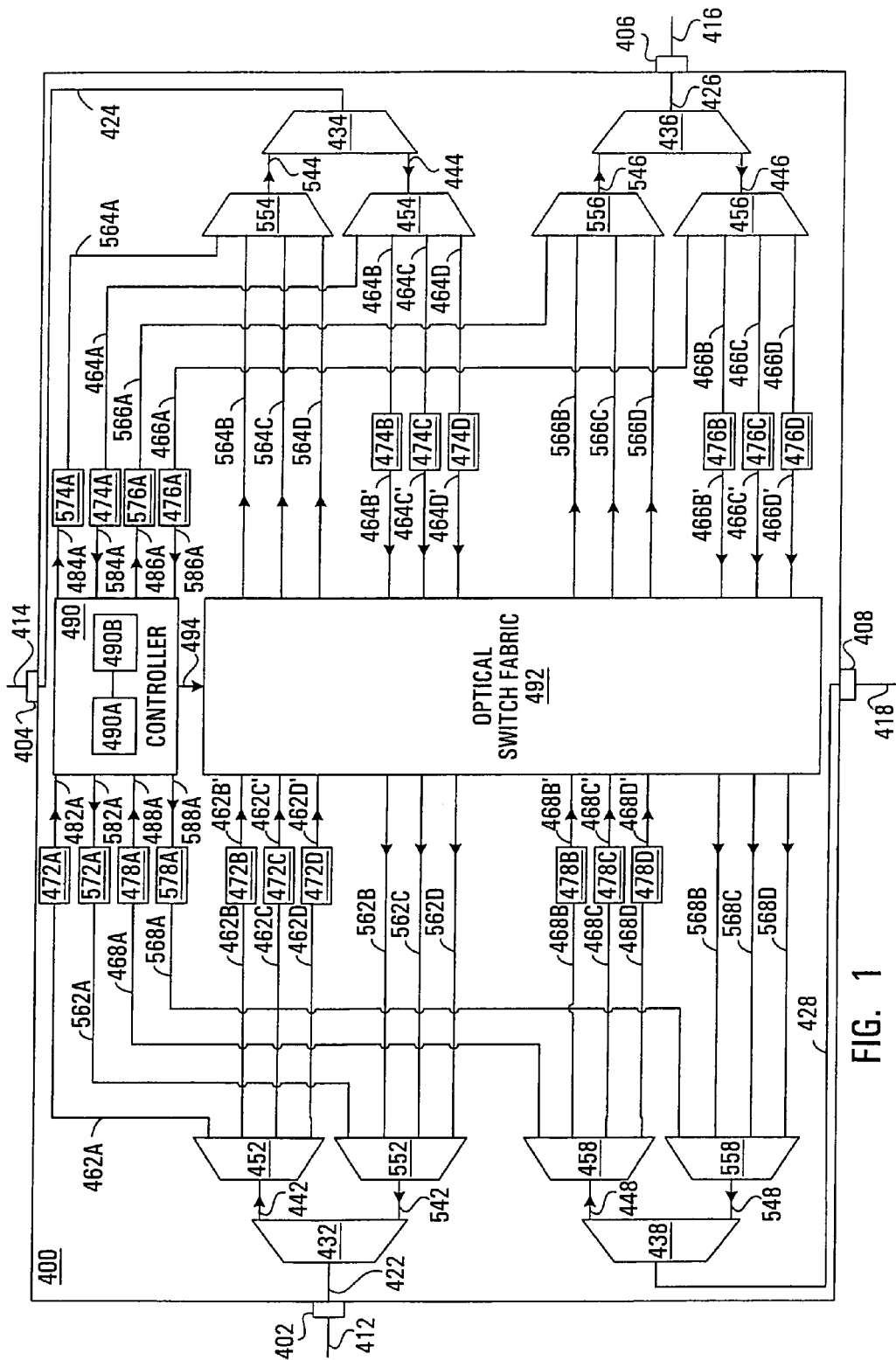
FIG. 1 illustrates in schematic form a switching node in accordance with the preferred embodiment of the present invention.

FIG. 1 shows an optical switching node 400 for connection to other switching nodes in an optical network. According to the preferred embodiment of the present invention, the switching node 400 comprises a plurality of ports 402, 404, 406, 408 connected externally to a respective plurality of multi-wavelength optical fiber segments 412, 414, 416, 418. Optical fiber segments 412, 414, 416, 418 are bidirectional and serve both as ingress and egress links to neighbouring switching nodes (not shown). Alternatively, multiple optical fiber segments (e.g., one for ingress and one for egress) could connect the switching node 400 to each of its neighbours.

Optical fiber segments 412, 414, 416, 418 preferably carry data to and from the neighbouring switching nodes. Optical fiber segments 412, 414, 416, 418 also preferably serve as control links between the neighbouring switching nodes by using dedicated supervisory wavelengths (known as an optical supervisory channel). Other ways of establishing control links to the switching node include the use of dedicated electronic control lines.

Although depicted as having four ports, the switching node 400 can have any number of ports greater than or equal to two.

Also, while optical fiber segments 412, 414, 416, 418 are intended to be connected between ports of neighbouring switching nodes, it should be understood that one or more of the optical fiber segments 412, 414, 416, 418 can be used for transporting individual or multiplexed optical channels to or from customer premises equipment. In this case, the switching node 400 would be referred to as an add/drop node.

Within the switching node 400, ports 402, 404, 406, 408 are connected to respective directional couplers 432, 434, 436, 438 by respective intermediate optical fiber segments 422, 424, 426, 428. Intermediate optical fiber segments 422, 424, 426, 428 are bidirectional and preferably carry both data and control signals to and from the inside of the switching node 400. The directional couplers 432, 434, 436, 438 are known components which couple two unidirectional multi-wavelength signals travelling in opposite directions to a single bidirectional multi-wavelength signal.

In one direction, each directional coupler 432, 434, 436, 438 retrieves incoming data and control signals carried on the respective intermediate optical fiber segment 422, 424, 426, 428 and feeds the incoming signals so retrieved to a respective optical demultiplexer 452, 454, 456, 458 along a respective intermediate optical fiber segment 442, 444, 446, 448.

In the opposite direction, outgoing data and control signals are fed to the directional couplers 432, 434, 436, 438 by a respective optical multiplexer 552, 554, 556, 558 along a respective intermediate optical fiber segment 542, 544, 546, 548. Each directional coupler 432, 434, 436, 438 transfers the respective outgoing data and control signals onto the respective intermediate fiber optic segment 422, 424, 426, 428 connected to the respective port 402, 404, 406, 408.

Each optical demultiplexer 452, 454, 456, 458 separates the multi-wavelength optical signal arriving on the respective intermediate optical fiber segment 442, 444, 446, 448 on the basis of wavelength to produce a respective set of individual optical signals appearing on a respective plurality of single-wavelength optical fiber segments 462A-D, 464A-D, 466A-D, 468A-D.

Although FIG. 1 shows each of the optical demultiplexers 452, 454, 456, 458 as being associated with four single-wavelength optical fiber segments, it is to be understood that the number of segments emanating from an optical demultiplexer can correspond to the number of wavelengths in each multi-wavelength optical signal arriving at the respective optical demultiplexer along the respective intermediate optical fiber segment 442, 444, 446, 448.

Among the plurality of single-wavelength optical fiber segments emanating from each demultiplexer, at least one of these will preferably be used for transporting control information and the remaining ones will preferably be used for transporting data to be switched. The transport of control information on a dedicated wavelength between two switching nodes is known as establishing an "out-of-band" control channel. Alternatively, an "in-band" control channel can be established by embedding a control-laden header within the data transported between two switching nodes, e.g., in a header portion.

In the specific case of FIG. 1, single-wavelength optical fiber segments 462A, 464A, 466A, 468A provide out-of-band control channels for carrying incoming control information from neighbouring switching nodes. Each single-wavelength optical fiber segment 462A, 464A, 466A, 468A is connected to a respective optoelectronic converter 472A, 474A, 476A, 478A. Each optoelectronic converter 472A, 474A, 476A, 478A converts the optical control signal on the respective single-wavelength optical fiber segment 462A, 464A, 466A, 468A into an electronic control signal on a respective input control line 482A, 484A, 486A, 488A. Input control lines 482A, 484A, 486A, 488A are connected to a controller 490.

The remaining sets single-wavelength optical fiber segments 462B-D, 464B-D, 466B-D, 468B-D carry incoming data and each set is fed to a respective bank of controllable wavelength converters 472B-D, 474B-D, 476B-D, 478B-D. Each wavelength converter 472B-D, 474B-D, 476B-D, 478B-D is a device which translates the optical signal on the respective single-wavelength optical fiber segment 462B-D, 464B-D, 466B-D, 468B-D from its present wavelength onto a (possibly different) wavelength specified by a control signal sent by the controller 490 along a respective control line (not shown).

It should be appreciated that wavelength conversion as performed by the wavelength converters 472B-D, 474B-D, 476B-D, 478B-D could be achieved via direct optical methods or by conversion into the electronic domain, followed by conversion back into the optical domain on another specified wavelength.

The signals converted by each bank of wavelength converters 472B-D, 474B-D, 476B-D, 478B-D appear on a respective set of single-wavelength input optical fiber segments 462B'-D', 464B'-D', 466B'-D', 468B'-D' which are fed to respective input ports of an optical switch fabric 492.

The optical switch fabric 492 also has a plurality of output ports connected to a respective plurality of single-wavelength output optical fiber segments 562B-D, 564B-D, 566B-D, 568B-D. The optical switch fabric 492 comprises circuitry for controllably establishing one-to-one optical connections between single-wavelength input optical fiber segments 462B'-D', 464B'-D', 466B'-D', 468B'-D' and single-wavelength output optical fiber segments 562B-D, 564B-D, 566B-D, 568B-D. The data connections are established on the basis of mapping instructions received from the controller 490 via a control line 494.

Those skilled in the art will appreciate that because the various intermediate optical fiber segments 442, 444, 446, 448, 542, 544, 546, 548 may accommodate differing numbers of wavelengths, the number of single-wavelength output optical fiber segments connected to the optical switch fabric 492 may differ from the number of single-wavelength input optical fiber segments connected thereto.

It will also be understood that the banks of wavelength converters could be connected to the single-wavelength output optical fiber segments 562B-D, 564B-D, 566B-D, 568B-D at the output of the optical switch fabric 492 rather than to the single-wavelength input optical fiber segments 462B'-D', 464B'-D', 466B'-D', 468B'-D' at the input of the optical switch fabric 492.

A plurality of output control lines 582A, 584A, 586A, 588A emanating from the controller 490 form part of the respective out-of-band control channels linking the switching node 400 to neighbouring switching nodes. The output control lines 582A, 584A, 586A, 588A are respectively connected to a plurality of optoelectronic converters 572A, 574A, 576A, 578A. The optoelectronic converters 572A, 574A, 576A, 578A convert electronic control signals output by the controller 490 into optical signals appearing on respective single-wavelength optical fiber segments 562A, 564A, 566A, 568A.

Each single-wavelength optical fiber segment 562A, 564A, 566A, 568A carrying outgoing control information from the controller 490 is connected to a respective one of the optical multiplexers 552, 554, 556, 558. Also leading to the optical multiplexers 552, 554, 556, 558 are respective sets of single-wavelength output optical fiber segments 562B-D, 564B-D, 566B-D, 568B-D carrying switched signals (i.e., outgoing data) from the optical switch fabric 492. The optical multiplexers 552, 554, 556, 558 combine the individual optical signals carried by respective groups of single-wavelength optical fiber segments 562A-D, 564A-D, 566A-D, 568A-D into respective multi-wavelength optical signals carried to respective directional couplers 432, 434, 436, 438 by respective intermediate optical fiber segments 542, 544, 546, 548.

The controller 490 preferably comprises a processor 490A connected to a memory element 490B. The processor 490A is preferably a micro-processor running a software algorithm. Alternatively, the processor could be a digital signal processor or other programmable logic device.

Figure 2A:
FIG. 2A shows a possible structure of a wavelength availability table created by the controller in the switching node of FIG. 1.

The memory element 490B stores wavelength availability information in the form of a wavelength availability table. FIG. 2A shows the structure of a wavelength availability table 700 in accordance with the preferred embodiment of the present invention. The wavelength availability table 700 comprises a PORT column 710, a WAVELENGTH column 720 and an AVAILABILITY column 730. The PORT column 710 contains one entry for each port in the switching node. In the case of the switching node 400 in FIG. 1, the number of ports, and therefore the number of entries in the PORT column 710 of the wavelength availability table 700, is equal to four. The ports are identified by their reference numerals from FIG. 1, namely 402, 404, 406 and 408.

For each row corresponding to a given port, there may be multiple entries in the WAVELENGTH column 720, depending on the number of wavelengths that can enter or exit the switching node through that port. For example, in the case of the switching node 400 in FIG. 1, there are six entries in the WAVELENGTH column 720 corresponding to each of the ports 402, 404, 406, 408. For each entry in the WAVELENGTH column 720, there is an entry in the AVAILABILITY column 730 indicating whether or not the corresponding wavelength is currently occupied on the corresponding port. A binary value is adequate for representing each entry in the AVAILABILITY column 730.

The memory element 490B also stores topological information about the network. Specifically, the memory element 490B stores the identity of those switching nodes which are directly connected to switching node 400 via one of the optical fiber segments 412, 414, 416, 418. The memory element 490B also stores similar topological information about the rest of the network, which is transmitted to the switching node 400 by the neighbouring switching nodes. The processor 490A in the switching node 400 uses topological information stored in the memory element 490B to construct a topological tree of the entire network with the switching node 400 as the root. This tree is then used by the processor 490A to construct a routing table which is also stored in the memory element 490B.

Figure 2B:
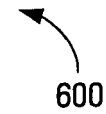
FIG. 2B shows a possible structure of a routing table created by the controller in the switching node of FIG. 1.

FIG. 2B illustrates the format of a routing table 600 in accordance with the preferred embodiment of the invention. The routing table 600 preferably contains four fields, namely a source switching node (SSN) field 610, a destination switching node (DSN) field 620, a traffic characteristic information (TCI) field 630 and a next hop switching node (NHSN) field 640.

The entries in the SSN and DSN fields 610, 620 account for every possible combination of end switching nodes in the network. The TCI field 630 contains the traffic characteristic information received from the switching node identified by the entry in the DSN field 620 of the corresponding row in the routing table. In this way, the TCI field 630 identifies the signalling formats acceptable by the respective optical interface in each destination switching node.

Typically, it will not be possible to send data from a source switching node to a destination switching node without passing through at least one intermediate switching node. Thus, the switching node 400 will generally be one in a series of intermediate switching nodes located between source and destination. The next intermediate node along the route leading to the destination switching node is known as the next hop switching node and is identified in the NHSN field 640 of the routing table. The next hop switching node is a function of the source switching node, the destination switching node, the network topology and the position of the current switching node within that topology. Thus, the routing table is different for each switching node in the network and is basically static, changing only when the network undergoes a topological alteration.

In operation, the manner in which control information is communicated and interpreted by the various switching nodes in the network is governed by a network-layer wavelength routing (WR) protocol. An end-to-end path for transferring data from a source switching node to a destination switching node along a path in a network can be established by having each switching node participate in a network-layer wavelength distribution (WD) protocol. Both protocols are now described.

Figure 5:
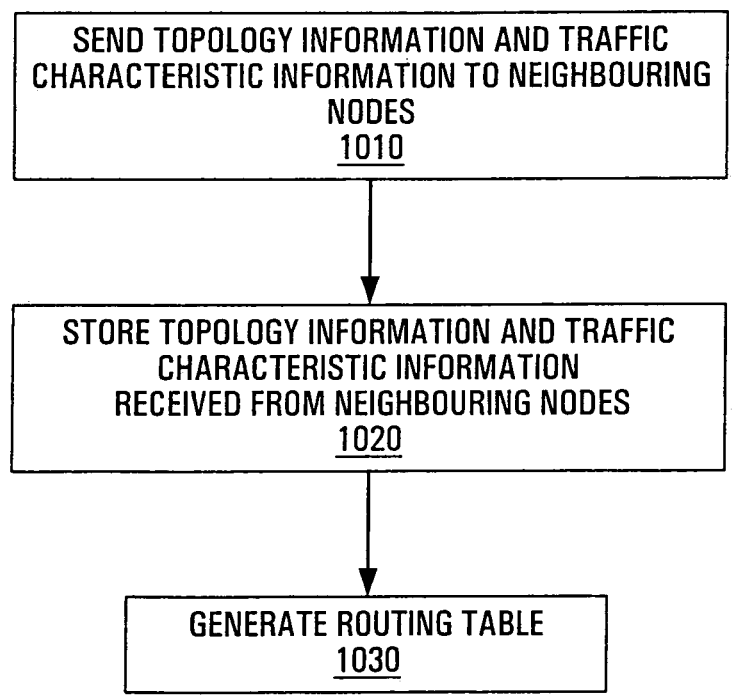
FIG. 5 shows a flowchart illustrating an inventive wavelength routing protocol.

The WR protocol is implemented by having the processor in each switching node run an algorithm such as the one illustrated in the flowchart of FIG. 5. Specifically, FIG. 5 depicts an information propagation step 1010, an information storing step 1020 and an information processing step 1030.

Firstly, the propagation step 1010 consists of the controller 490 sending topology information and traffic characteristic information to neighbouring switching nodes via the appropriate control channel (either out-of-band or in-band). The topology information includes the identity of the switching node 400 and the identity of each switching node adjacent the switching node 400 and connected to one of its ports. The traffic characteristic information may consist of a listing of signalling types that are acceptable to each port. The contents of this listing may be governed by end user formatting requirements.

In addition, as another part of the propagation step 1010, the switching node 400 relays control information received from any neighbouring switching node to all other neighbouring switching nodes. The control information sent by the switching node 400 can be transmitted at regular intervals of, for instance, ten seconds or, alternatively, only when there is a change in the received control information.

It is noted that because each switching node forwards not only its own control information but also that of its immediate neighbours, every switching node is recursively made aware of the topology of the entire network and of the acceptable signalling types associated with each switching node in the network.

The storing step 1020 consists of the controller 490 storing, in the memory element 490B, its own topology and traffic characteristic information as well as that received from neighbouring switching nodes.

Finally, the processing step 1030 consists of the controller 490 in the switching node 400 generating the routing table stored in the memory element 490B, either periodically or after a topology change, as a function of the network topology information and traffic characteristic information stored in the storing step 1020. With reference to the routing table shown in FIG. 2B, in order to fill the NHSN field 640 for a particular row in the routing table 600, the software in the processor of the switching node executes a next hop routing algorithm, for example the well-known Dijkstra algorithm.

(See J. Moy, *Network Working Group RFC* 1583, pp. 142-160, hereby incorporated by reference herein). If the Dijkstra algorithm produces no suitable next hop switching node for a given row in the routing table 600, this fact can be signalled by leaving blank the corresponding entry in the NHSN and TCI fields 630, 640, respectively.

Figure 6:
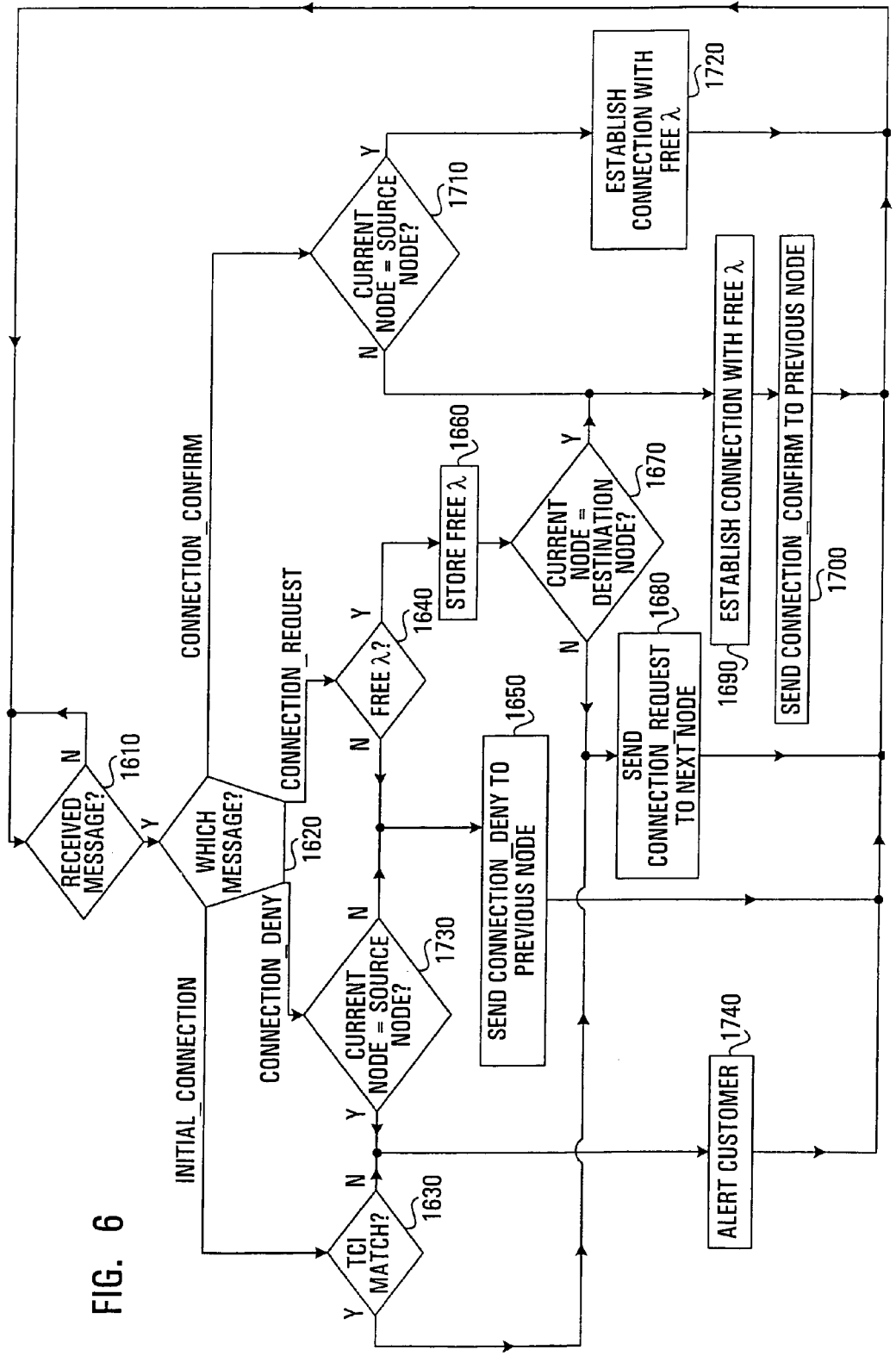
FIG. 6 shows a flowchart illustrating an inventive wavelength distribution protocol.

The WD protocol is implemented by the processor in each switching node running an algorithm such as the one illustrated in the flowchart of FIG. 6. The inventive wavelength distribution (WD) protocol consists of the exchange and interpretation of several types of messages, including an INITIAL_CONNECTION_REQUEST message, a CONNECTION_REQUEST message, a CONNECTION_CONFIRM message and a CONNECTION_DENY message.

Referring to the flowchart in FIG. 6 and, more specifically, to step 1610, the processor in a given switching node waits to receive a message. Upon receipt of a message the processor verifies, at step 1620, whether it is an INITIAL_CONNECTION_REQUEST message. An INITIAL_CONNECTION_REQUEST message is typically generated by customer premises equipment connected to the source switching node, for example.

If the received message is indeed an INITIAL_CONNECTION_REQUEST message, then it will specify the source and destination switching nodes, as well as the signalling format (say, $TCI_S$) used by the interface connected to the source switching node. At step 1630, the processor verifies whether $TCI_S$ matches any one of the signalling formats accepted by the interface connected to the destination switching node. If there is no TCI match, then the source switching node customer is informed that a connection cannot be established.

On the other hand, if there is a TCI match, then the processor looks up the entry in the NHSN field of the row of the routing table associated with the source and destination switching nodes and subsequently sends a CONNECTION_REQUEST message to the switching node identified by that entry. The CONNECTION_REQUEST message preferably contains a SSN parameter for identifying the source switching node and a DSN parameter for identifying the destination switching node. The intended recipient of the CONNECTION_REQUEST message is also known as the "next" switching node along the route between the source and destination nodes.

The message found to be received at step 1620 might not be an INITIAL_CONNECTION_REQUEST message, but may be a CONNECTION_REQUEST message (such as the one sent by the source switching node after an INITIAL_CONNECTION_REQUEST message). The CONNECTION_REQUEST message is assumed to be received by the current switching node from a "previous" switching node along the route between the source and destination switching nodes.

In the event that a CONNECTION_REQUEST message was received, step 1640 provides verification of whether there is a free wavelength between the previous switching node and the current switching node. If there is no such wavelength, then the processor causes a CONNECTION_DENY message to be sent to the previous switching node, as indicated at step 1650.

On the other hand, if there is a free wavelength, then step 1660 consists of storing this free wavelength in the memory element connected to the processor in the current switching node. This is followed by step 1670, at which it is verified whether the current switching node is in fact the destination switching node. If not, then, as indicated by step 1680, the CONNECTION_REQUEST message is forwarded to the next switching node along the route.

If, however, the current switching node is indeed the destination switching node, then step 1690 involves the establishment of a data connection through the optical switch fabric of the current switching node. This can be achieved by the controller 490 providing an appropriate mapping instruction to the optical switch fabric 492. This connection links the single-wavelength optical fiber associated with the free wavelength (as stored in the memory element after execution of step 1660) and the optical fiber segment leading to the customer premises equipment connected to the destination switching node.

If the wavelength occupied by the customer premises equipment is different from the free wavelength stored in the memory element, then appropriate instructions must also be sent to the wavelength converter associated with the free wavelength. Furthermore, the wavelength availability table is updated to reflect that the "free" wavelength is no longer available on the corresponding port linking the current switching node with the previous switching node.

After a connection has been established, step 1700 indicates that a CONNECTION_CONFIRM message is sent to the previous switching node, which is now optically connected to the current switching node by the free wavelength. The CONNECTION_CONFIRM message specifies the free wavelength.

Returning now to step 1620, if the received message is a CONNECTION_DENY message, then as indicated at step 1730, the action to be taken depends on whether the current switching node is the source switching node. If the current switching node is not the source switching node, then the CONNECTION_DENY message is backwarded to the previous switching node as indicated at step 1650. Thus, the CONNECTION_DENY message eventually reaches the source switching node where, according to step 1740, the customer is alerted to the fact that a connection cannot be established.

Finally, if the message found to be received at step 1620 is a CONNECTION_CONFIRM message, then the action to be taken again depends on whether the current switching node is the source switching node as indicated at step 1710. If the current switching node is indeed the source switching node, then a connection is established (step 1720) between the optical fiber segment connected to the customer premises equipment and the single-wavelength optical fiber segment carrying data between the source switching node and the next switching node.

Otherwise (step 1690), a connection is established which joins the single-wavelength optical fiber segment carrying data between the current switching node and the previous and next switching nodes. In addition, the locally stored wavelength availability table is also updated to reflect the new wavelength occupancy on the optical fiber segment carrying data between the current switching node and the previous and next switching nodes. If necessary, wavelength conversion instructions are sent in either case to the appropriate wavelength converter. As shown at step 1700, a CONNECTION_CONFIRM message is subsequently sent to the previous switching node.

An example illustrating how an end-to-end connection is prepared using the WD protocol is now described with reference to FIG. 3, which shows an optical network 800 comprising a plurality of switching nodes 802-824 connected in a meshed matrix pattern via a plurality of optical fiber segments 826-858. Switching node 802 is connected to customer premises equipment (CPE) 860 via an optical fiber segment 862 which uses a wavelength $\lambda_S$. The CPE 860 uses a signalling format which may be denoted $TCI_S$. Switching node 824 is connected to CPE 864 via an optical fiber segment 866 which uses a wavelength $\lambda_F$. The CPE 864 accepts signalling formats which may be identified by the set $\{TCI_F\}$.

Figure 7A:
FIGS. 7A and 7B illustrate routing table entries for two switching nodes along the route in FIG. 3.

The switching nodes 802-824 participate in the inventive WR protocol. Thus, a routing table will be generated at each switching node. This routing table is different for each switching node but is static until the topology of the network changes. For purposes of illustration and without loss of generality, FIG. 7A shows part of a routing table 905 generated at switching node 802 corresponding to the row in which the source switching node is designated as switching node 802 and the destination switching node is designated as switching node 824. Specifically, the entry in the TCI column 630 indicates that the CPE 864 connected to switching node 824 is capable of receiving data in the listed formats, namely OC-4, OC-32, OC-192 and Gigabit Ethernet (GBE). The entry in the NHSN column 640 indicates that the next hop switching node in the route joining switching nodes 802 and 824 is switching node 808.

Figure 7B:

Similarly, FIG. 7B shows an example row from a routing table 950 stored in the memory element of switching node 808. This row again corresponds to the source-destination combination involving switching nodes 802 and 824, respectively. Of course, the routing table 950 is generated from the perspective of switching node 808 and therefore the entries in the NHSN column 640 will be different from those in the routing table 905 stored in switching node 802. In the example of FIG. 7B, the entry in the NHSN column 640 specifies switching node 810. Similarly, the corresponding entry in the NHSN column 640 in the routing tables stored in switching nodes 810, 816 and 818 can specify switching node 816, 818 and 824, respectively.

Figure 3:
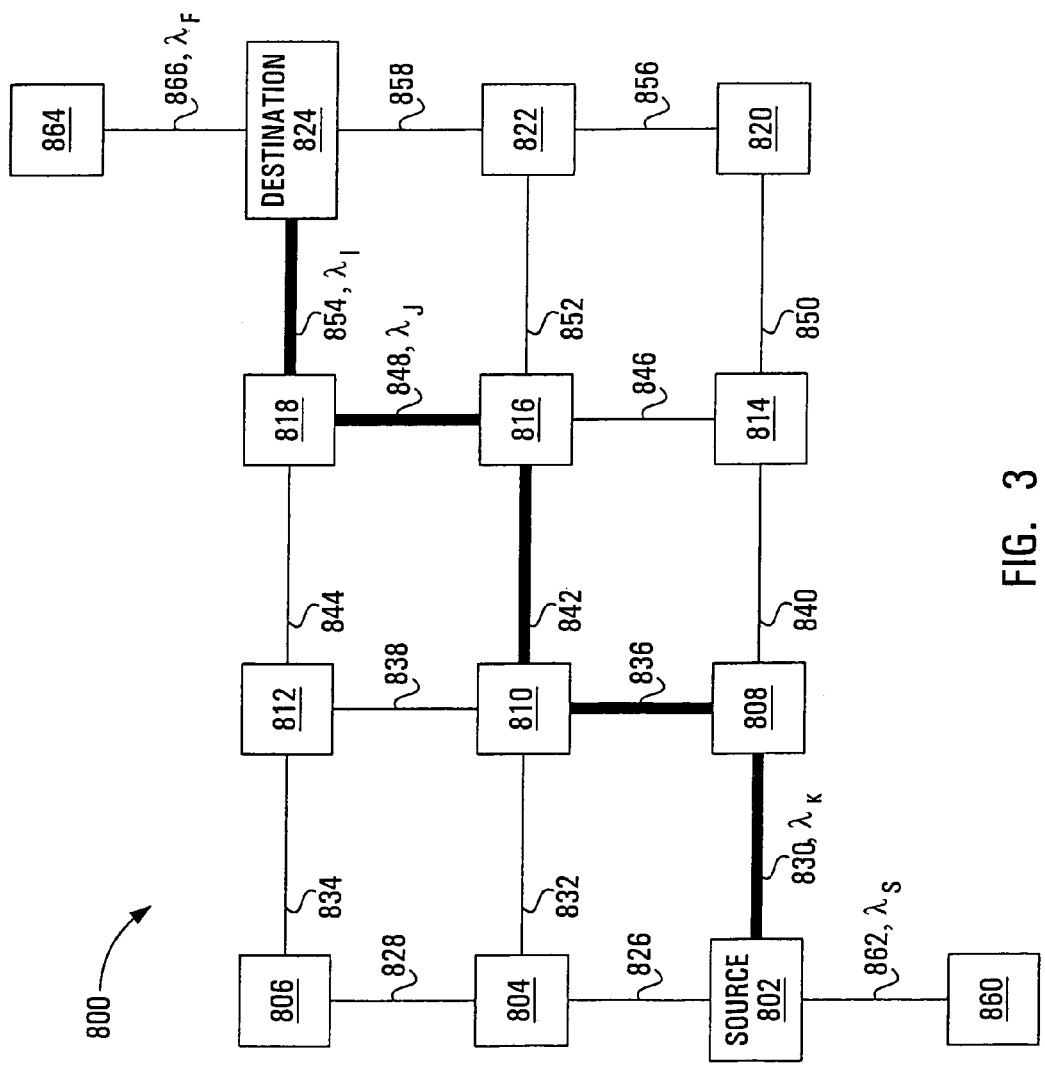
FIG. 3 illustrates in schematic form an optical network and a route linking two switching nodes in the network.

Thus, a potential route exists between switching node 802 and 824, consisting of optical fiber segments 830, 836, 842, 848 and 854 as indicated by the thick solid line in FIG. 3. Similarly, potential routes exist between all other combinations of source switching node and destination switching node.

The messaging scheme of the WD protocol is now illustrated with continued reference to the network of FIG. 3 and the flowchart of FIG. 6. Firstly, the desire to establish an end-to-end data connection between CPE 860 and CPE 864 is signalled to the source switching node 802 in any suitable way. That is to say, an INITIAL_CONNECTION_REQUEST message is received by switching node 802.

In accordance with the WD protocol (at step 1630), switching node 802 compares the signalling format of CPE 860, namely $TCI_S$, to the set of acceptable signalling formats associated with CPE 864, namely the set $\{TCI_F\}$. If a TCI match is detected, then the processor in the source switching node 802 consults its routing table (FIG. 7A) and extracts the identity of the switching node in the NHSN field of the row corresponding to the particular source-destination switching node combination. In this case, the switching node so identified would be switching node 808. (It should be noted that if $TCI_S$ is not an element of the set $\{TCI_F\}$, then the connection request is denied. As indicated in step 1740 of FIG. 6, the controller in the source switching node 802 may take action to alert the end user that the connection request has been denied.)

The processor in the source switching node 802 then formulates a CONNECTION_REQUEST message for transmission to switching node 808 (step 1680). The CONNECTION_REQUEST message identified switching node 802 as the source switching node and switching node 824 as the destination switching node. The CONNECTION_REQUEST message is transmitted by the source switching node 802 to switching node 808 via the appropriate out-of-band or in-band control channel.

In accordance with step 1640 of FIG. 6, switching node 808 consults its wavelength availability table to determine whether there is a free wavelength on the fiber optic segment 830 linking it to the previous switching node, in this case source switching node 802. Consequently, either a wavelength is found, in which case the wavelength request is further propagated along the route by forwarding a copy of the CONNECTION_REQUEST message to switching node 810 (step 1680), or a wavelength is not found, in which case the connection request is denied and a CONNECTION_DENY message is sent back to the source switching node 802 (step 1650). In this case, since switching node 808 is not the destination switching node 824, a connection is not yet established.

If sent, the CONNECTION_DENY message is of a suitable format indicating that the connection request has been denied and the reasons therefor, in this case, an inability to find an available wavelength on fiber optic segment 830. According to steps 1730 and 1740 of FIG. 6, upon receipt of a CONNECTION_DENY message, the controller in the source switching node 802 may take action to alert the end user of CPE 860 that the connection request has been denied.

Each of the switching nodes 810, 816, 818 runs the same algorithm and therefore performs essentially the same tasks as switching node 808. Hence, if wavelengths are available on each of fiber optic segments 836, 842 and 848, the CONNECTION_REQUEST message will eventually be received at the destination switching node 824. Similarly, a CONNECTION_DENY message returned to an one of the switching nodes 810, 816, 818 is relayed back to the source switching node 802, where action can be taken to alert the end user that a connection request has been denied.

Assuming that $TCI_S$ belongs to the set $\{TCI_F\}$ and that a suitable wavelength path is available, the CONNECTION_REQUEST message transmitted by the source switching node 802 will eventually reach the destination switching node 824 via "intermediate" switching nodes 808, 810, 816 and 818. Since it is identified by the DSN parameter in the CONNECTION_REQUEST message, the destination switching node 824 knows that it is the last switching node on the potential route leading from the source switching node 802. In the example scenario of FIG. 3, the final destination is CPE 864 which is connected to the destination switching node 824 via optical fiber segment 866 adapted to carry optical signals on wavelength $\lambda_F$. In response to the CONNECTION_REQUEST message, the processor in the destination switching node 824 attempts to find a free wavelength on optical fiber segment 854 connecting the destination switching node 824 with intermediate switching node 818.

If such a wavelength is found, say $\lambda_I$, then a data connection is established (step 1720). Specifically, the controller sends mapping instructions to its optical switch fabric for switching the optical signal on the single-wavelength input optical fiber segment associated with $\lambda_I$ over to the optical fiber segment 866 leading to the customer premises equipment 864. In addition, the controller sends the value of the wavelength $\lambda_F$ to the wavelength converter associated with the single-wavelength input optical fiber segment carrying the optical signal on wavelength $\lambda_I$. If $\lambda_I$ is different from $\lambda_F$, that wavelength converter will be required to perform wavelength conversion. Furthermore, the destination switching node 824 updates its wavelength availability table with information about the newly established data connection. That is to say, the entry in the AVAILABILITY field 730 of the appropriate row is given a value indicating the fact that wavelength $\lambda_I$ on optical fiber segment 854 is taken, i.e., unavailable.

After instructing its optical switch fabric to set up a data connection, the WD protocol as described at step 1700 in FIG. 7 requires that the destination switching node 824 send a CONNECTION_CONFIRM message to the intermediate switching node 818. The CONNECTION_CONFIRM message specifies the wavelength $\lambda_I$, which is the wavelength (prior to wavelength conversion) associated with the single-wavelength input optical fiber segment connected through the optical switch fabric in the destination switching node 824.

Upon receipt of the CONNECTION_CONFIRM message sent by the destination switching node 824, intermediate switching node 818 itself establishes a connection between the single-wavelength output optical fiber whose signal at wavelength $\lambda_I$ is carried on optical fiber segment 854 and the single-wavelength input optical fiber 848 whose signal at the previously stored free wavelength (say, $\lambda_J$) is carried on optical fiber segment 848. If $\lambda_I$ does not equal $\lambda_J$, then the corresponding wavelength converter is instructed to perform the appropriate wavelength conversion. The controller in intermediate switching node 818 then updates its wavelength availability table and subsequently sends a CONNECTION_CONFIRM message to intermediate switching node 816. This message will specify $\lambda_J$ (rather than $\lambda_I$ or $\lambda_F$) Backtracking of the CONNECTION_CONFIRM message continues until this message is received at the source switching node 802. According to step 1720 of the algorithm described with reference to FIG. 7, the controller in the source switching node 802 sends mapping instructions to its optical switch fabric with the aim of establishing a connection between the optical fiber segment 862 occupying wavelength $\lambda_S$ connected to CPE 860 and the single-wavelength optical fiber segment whose signal is carried on a wavelength $\lambda_K$ by optical fiber segment 830. If $\lambda_K$ differs from $\lambda_S$, wavelength conversion commands are sent to the wavelength converter associated with optical fiber segment 862.

From the above, it is seen that the route between the source and destination switching nodes 802, 824 consisting of optical fiber segments 830, 836, 842, 848, 854 may occupy different wavelengths. As a result of topology and traffic characteristic information exchanged automatically by virtue of the various switching nodes participating in the WR protocol, the just described wavelength distribution (WD) protocol allows wavelengths to be assigned to specific optical fiber segments in a dynamic fashion each time a new connection is requested. Consequently, the available network bandwidth is used more efficiently and the time, effort and cost involved in configuring the switching nodes in the network are dramatically reduced.

While the above description of the WD protocol has dealt with the case in which a source switching node wishes to unilaterally send data to a destination switching node, the present invention also applies to the case in which one switching node wishes to extract data from another. In this reverse unidirectional situation, it is more appropriate to call the two end switching nodes "client" (wishing to receive data) and "server" (transmitting the data to the client) switching nodes.

Considering the example network and proposed route shown in FIG. 3, it can be assumed that the client is connected to switching node 802 and that the server is connected to switching node 824. The client 802 is connected to CPE 860 via an optical fiber segment 862, while the server 824 is connected to a data base 864 via an optical fiber segment 866. The above-described WR protocol remains the mechanism by which the various switching nodes in the network exchange and process control information. However, to accommodate the transfer of data from server 824 to client 802 (which is in the opposite direction to the data flow in the previously described source-destination example), the WD protocol is slightly modified.

Specifically, step 1630 in FIG. 6 (in which a TCI comparison is to be performed) may not be executable at the client switching node since the signalling type transmitted by the server may not be known. Therefore, this step must be postponed until a CONNECTION_REQUEST message is received at the server switching node, whereupon this step is performed by the server switching node.

It should also be understood that although route selection is achieved by the switching nodes executing a routing control algorithm, it is possible for the source switching node or client to preselect the desired route through the network for particular combinations of end points. In other words, the NSHN entries in the routing table in each switching node can be pre-computed. Manual route pre-selection is also acceptable as there are advantages to be gained by having the wavelengths dynamically assigned along each segment in the route in accordance with the WD protocol. Thus, the WR protocol could simply be used for distributing and gathering traffic characteristic information, while omitting the processing step.

It is also within the scope of the invention to provide a bidirectional data connection between two end switching nodes. Wavelength allocation for one direction of communication can follow the algorithm in the above source-destination scenario, while wavelength allocation for the reverse direction can follow the algorithm in the above-described client-server scenario.

Moreover, the invention extends to certain cases in which the signalling types at the end points do not match but are "compatible". For example, if the destination switching node accepts OC-48 signals but the source switching node transmits OC-12 signals, then either the end switching nodes or one of the intermediate switching nodes along the route between the two end switching nodes can be assigned the task of grooming the OC-12 signals so that they become OC-48 signals. In this case, OC-48 and OC-12 signalling types are said to be compatible.

Accordingly, the WD protocol can be modified so that a CONNECTION_DENY message is sent if all wavelengths are unavailable or if $TCI_S$ is incompatible with every element of the set $\{TCI_F\}$. Within each switching node, compatibility may be determined by consulting a table of compatible pairs of signalling types which can be stored in the respective memory element.

Figure 4:
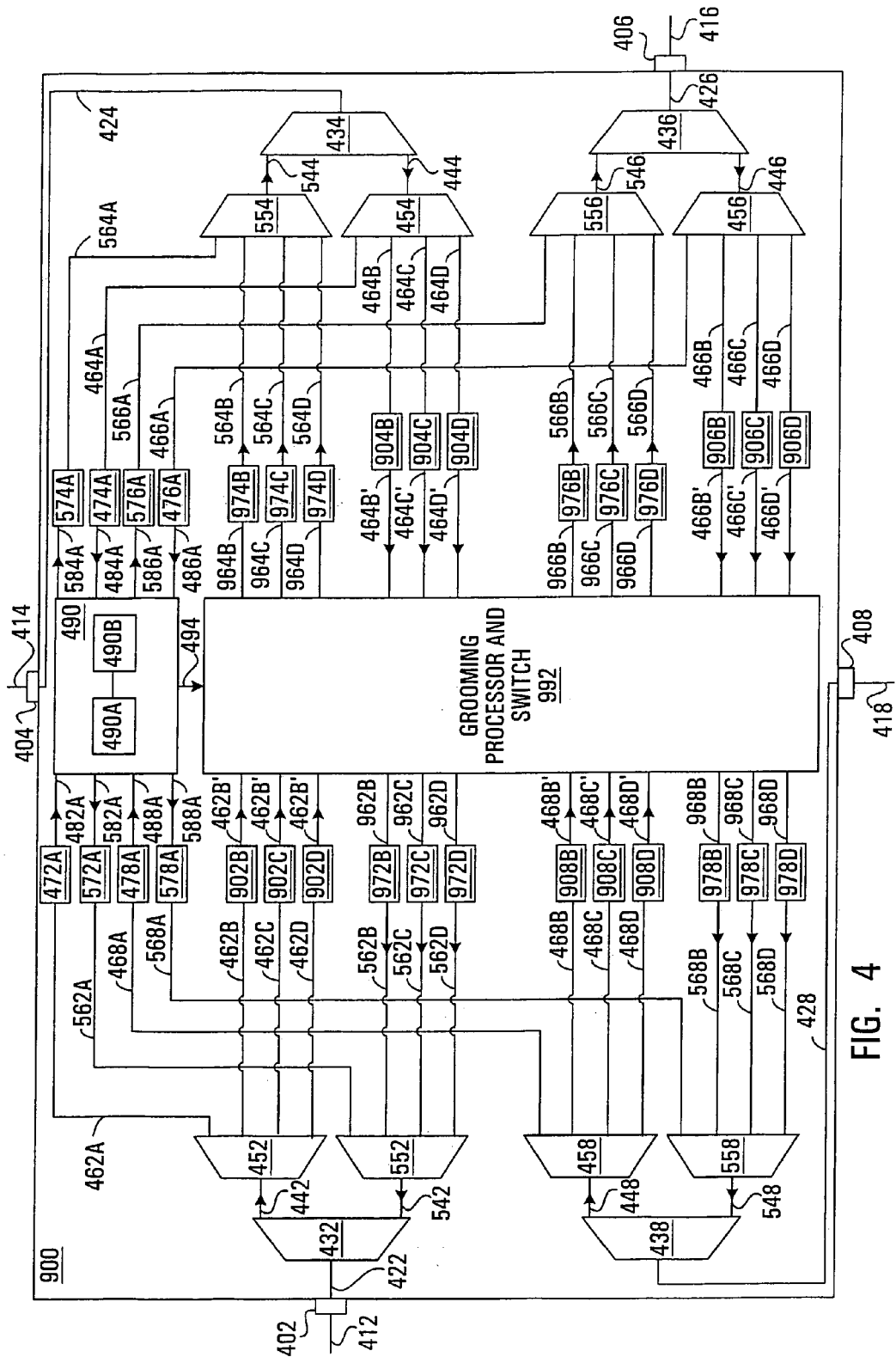
FIG. 4 illustrates in schematic form a switching node in accordance with an alternative embodiment of the present invention.

In order to provide the desired grooming functionality, it is necessary to modify the design of the switching node. FIG. 4 shows a switching node 900 in accordance with an alternative embodiment of the present invention. Switching node 900 is identical to switching node 400, except for certain differences which are now explained.

Switching node 900 comprises groups of optoelectronic converters 902B-D, 904B-D, 906B-D, 908B-D connected between respective demultiplexers 452, 454, 456, 458 and a grooming processor and switch 992. Converters 902B-D, 904B-D, 906B-D, 908B-D are used for converting received optical data signals on respective single-wavelength input optical fibers 462B-D, 464B-D, 466B-D, 468B-D into electrical signals fed to the grooming processor 992. Analog-to-digital converters (not shown) are preferably provided between the optoelectronic converters 902B-D, 904B-D, 906B-D, 908B-D and the grooming processor and switch 992.

The grooming processor and switch 992 is preferably a high-speed digital signal processor which is programmed to convert digital electronic signals from one signalling type to another. The grooming processor and switch 992 also provides a digital cross-connect facility for connecting each groomed electronic signal to any one of a plurality of electronic signal lines 962B-D, 964B-D, 966B-D, 968B-D.

Groups of electronic signal lines 962B-D, 964B-D, 966B-D, 968B-D are connected to respective optical multiplexers 552, 554, 556, 558 via respective, groups of optoelectronic converters 972B-D, 974B-D, 976B-D, 978B-D. The optoelectronic converters convert the respective electronic signals into optical signals at a wavelength controllable from the controller 490 via respective control lines (not shown). For this reason, wavelength converters are not explicitly required in the design of the switching node in FIG. 4, since their functionality is implicit in the optoelectronic converters 972B-D, 974B-D, 976B-D, 978B-D.

In accordance with another embodiment of the present invention, the switching nodes in FIGS. 1 and 4 and the WR and WD protocols governing their behaviour can be used to implement a reliable protection facility in a meshed network. More specifically, if a data connection is established over a particular fiber optic link and if that link fails, then a new data connection request can be initiated by the source switching node. Since each switching node participates in the WR protocol, the change in the topology of the network resulting from the broken link will automatically result in different values for the NHSN column in the respective routing tables.

Those skilled in the art will appreciate that a new connection request can be programmed to occur after a failure is detected, which request is handled by the WD protocol of the present invention, resulting in a new and reliable route for the originally disrupted data connection. Further advantages of relying on the WR and WD protocols described herein include wavelength efficiency, since protection wavelengths need not be dedicated in advance, as well as independent re-routing for different wavelengths occupied by a single optical fiber segment. This latter feature is advantageous because it allows the protection of individual wavelengths wherever there is capacity in the network.

According to yet another alternative embodiment of the invention, there may be provided an all-optical switching fabric similar to the switch fabric 492 in FIG. 1. However, instead of mapping each single-wavelength input optical fiber segment to one single-wavelength output optical fiber segment for the duration of a data connection, the switch fabric can be made responsive to switching instructions for a particular input optical signal that vary as a function of time.

This functionality can be useful in situations where the nature of the input optical signal is packet-based, with each packet having a header portion and a payload portion. The header may identify the source and destination switching nodes. Although different packets share the same wavelength and the same single-wavelength optical fiber segment, their associated headers may indicate an entirely different source and/or destination.

In this alternative embodiment of the invention, the switching node could thus comprise a bank of optical taps (e.g., PIN diodes) connected to the single-wavelength input optical fiber segments. These taps would be connected to optoelectronic converters, which would all be connected to the controller. The header of each incoming packet could thus be read and processed by the controller.

In operation, the wavelength routing (WR) protocol functions as previously described. Furthermore, once a data connection request is made, in which a respective source-destination pair is identified, a specific set of mapping instructions and wavelength conversion commands are generated using the wavelength distribution (WD) protocol, based on the network topology.

In this case, however, an additional step is performed before mapping the single-wavelength input optical fiber segment to the single-wavelength output optical fiber segment in order to establish a particular data connection. Specifically, the header of each packet on the input optical fiber segment is examined. It is only if the source and destination specified in the header match the source-destination pair for which a connection has been prepared using the WD protocol that the previously derived mapping instructions and wavelength conversion commands are used.

Of course, it is also within the scope of the invention to allow multiple mappings to be associated with each single-wavelength input optical fiber segment, with a single mapping being applied for each packet, depending on the source and destination switching nodes specified in the header.

While preferred and alternative embodiments of the present invention have been described and illustrated, it will be understood by those skilled in the art that further variations and modifications are possible while remaining within the scope of the invention as defined in the appended claims.

I claim:

1. A method of establishing a connection along a path in a communications network, the communications network comprising a plurality of switching nodes interconnected by optical links, the path being defined between a first one of the switching nodes and a second one of the switching nodes via at least one intermediate switching node, the at least one intermediate switching node being disposed between a respective first link and a respective second link of the path, the method comprising, at the at least one intermediate switching node:

maintaining an association between the respective first link and a respective first wavelength, the first wavelength being available on the respective first link;

receiving a message from a one of: the second one of the switching nodes and another intermediate switching node, the message indicative of an association between the respective second link and a respective second wavelength, the respective second wavelength being available on the respective second link;

mapping the combination of the respective first link and the respective first wavelength to the combination of the respective second link and the respective second wavelength; and storing the result of mapping in a memory element.

2. The method defined in claim 1, wherein the respective first link connects the intermediate switching node to the first one of the switching nodes, wherein the respective second link connects the intermediate switching node to the second one of the switching nodes, wherein the first one of the switching nodes is a source node with respect to establishing the connection and wherein the second one of the switching nodes is a destination node with respect to establishing the connection.

3. The method defined in claim 1, wherein receiving the message comprises receiving the message from the respective second link.

4. The method defined in claim 3, further comprising generating a second message indicative of the association between the respective first link and the respective first wavelength.

5. The method defined in claim 4, further comprising sending the second message towards the first one of the switching nodes.

6. The method defined in claim 5, further comprising sending the second message along the respective first link.

7. The method defined in claim 1, further comprising:
receiving optical signals at an input port from the first link at the first wavelength;
switching the optical signals received via the input port to an output port; and
outputting the switched signals via the output port at the second wavelength in accordance with the mapping.

8. The method defined in claim 1, further comprising:
determining whether there is a free wavelength between the first one of the switching nodes and the at least one intermediate node; and
if there is a free wavelength, the free wavelength is the respective first wavelength, and generating the association between the respective first wavelength and the respective first link.

9. The method defined in claim 8, wherein receiving the message indicative of the association between the respective second link and a respective second wavelength is received from the second one of the switching nodes, and the method further comprises:
sending a message to the first one of the switching nodes specifying the first respective wavelength.

10. The method defined in claim 9 further comprising:
after determining there is a free wavelength, sending a connection request to the second one of the switching nodes.

11. A method of establishing a connection along a path in a communications network, the communications network comprising a plurality of switching nodes interconnected by optical links, the path being defined between a first one of the switching nodes and a second one of the switching nodes via at least one intermediate switching node, the at least one intermediate switching node being disposed between a first link and a second link of the path, the method comprising, at the at least one intermediate switching node:
receiving a connection request message from the first one of the switching nodes over a first link;
determining whether there is a free wavelength available between the first one of the switching nodes and the at least one intermediate switching node over the first link;
if there is a free wavelength available, the free wavelength is determined to be the first wavelength, and generating an association between the first wavelength and the first link;
sending a connection request message to the second one of the switching nodes;
receiving a message from a one of: the second one of the switching nodes and another intermediate switching node, the message indicative of an association between the second link and a second wavelength, the second wavelength being available on the second link between the at least one intermediate switching node and a one of: the second one of the switching nodes and the other intermediate switching node;
mapping the association of the first link and the first wavelength to the association of the second link and the second wavelength; and
storing the mapping in a memory element.

12. The method defined in claim 11 further comprising:
receiving optical signals at an input port from the first link at the first wavelength;
switching the optical signals received via the input port to an output port in accordance with the stored mapping; and
outputting the switched signals via the output port at the second wavelength in accordance with the stored mapping.

13. The method defined in claim 12 wherein the first wavelength is different from the second wavelength.

14. The method defined in claim 11 further comprising:
updating a locally stored availability table reflecting the first wavelength carrying data between the first one of the switching nodes and the at least one intermediate switching node and reflecting the second wavelength carrying data between the second one of the switching nodes and the at least one intermediate switching node.

* * * * *